(12) United States Patent
Seifert

(10) Patent No.: US 6,332,685 B2
(45) Date of Patent: Dec. 25, 2001

(54) EYEPIECE CUP FOR BINOCULARS

(75) Inventor: Kuno Seifert, Mistelgau (DE)

(73) Assignee: Steiner-Optik GmbH, Bayreuth (DE)

( * ) Notice: Subject to any disclaimer, the term of this patent is extended or adjusted under 35 U.S.C. 154(b) by 0 days.

(21) Appl. No.: 09/761,155

(22) Filed: Jan. 17, 2001

(30) Foreign Application Priority Data

Jan. 17, 2000 (DE) .............................. 100 01 736

(51) Int. Cl.[7] .......................... G02B 21/00; G03B 11/04
(52) U.S. Cl. ....................... 359/600; 359/409; 359/507; 359/511
(58) Field of Search ................... 359/405–409, 359/399, 507, 511, 600, 611, 612

(56) References Cited

U.S. PATENT DOCUMENTS

| 1,965,755 | * | 7/1934 | Warmisham | 359/600 |
| 2,919,622 | * | 1/1960 | Hensoldt | 359/600 |
| 4,698,857 | * | 10/1987 | Kastendieck et al. | 2/426 |
| 4,971,429 | * | 11/1990 | Ishido et al. | 359/407 |

FOREIGN PATENT DOCUMENTS

| 20185 | * | 9/1899 | (CH) | 359/600 |
| 14224 | * | 4/1907 | (GB) | 359/600 |

* cited by examiner

Primary Examiner—Thong Nguyen
(74) Attorney, Agent, or Firm—Browdy and Neimark

(57) ABSTRACT

In an eyepiece cup for binoculars, which fits substantially tightly in particular around a user's eyes, provision is made for air admission holes.

4 Claims, 2 Drawing Sheets

EYEPIECE CUP FOR BINOCULARS

BACKGROUND OF THE INVENTION

1. Field of the Invention

The invention relates to an, in particular, ergonomically shaped eyepiece cup for binoculars.

2. Background Art

Eyepiece cups of the generic type have a human face contact area matched to the shape of the head in the vicinity of the eyes so that as close as possible a contact is attained, preventing scattered or extraneous light that might interfere with observation from entering. A close contact of this type, advantageous per se, is accompanied with the undesired side effect that the space between the eyepiece cup, the eye and the eyepiece is closed outwardly almost hermetically, there being the risk of fogging of the eyepiece lens.

SUMMARY OF THE INVENTION

It is an object of the invention to embody an ergonomically shaped eyepiece cup such that this fogging is largely prevented.

According to the invention this object is attained by air admission holes being formed on the eyepiece cup for ventilation of the interior.

Preferably it is provided that the air admission holes are distributed around the eyepiece cup at a distance from each other in the area above the eyepiece, the air current that enters through the air admission holes being deviated. In this way it is attained that no light can penetrate through the air admission holes and that the admitted air does not hit the eye of the user.

By advantage it can be provided that the admitted air current is deviated onto the inside of the eyepiece lens so that the lens is reliably kept non-fogging and the air current is guided away from the user's eye.

For optimal contact of the eyepiece cup with the user's face to be ensured in spite of adjustment of the eyepiece, the eyepiece cup may be pivotal relative to the eyepiece.

If binoculars with eyepiece cups according to the invention are used in the open air, the available blast will as a rule be sufficient to produce a satisfactory air current.

As compared to this, controlled ventilation may be provided in order to meet the requirements in very humid regions or in closed rooms as for example in watchtowers.

Such a controlled ventilation can be put into practice by a sort of a fan or by pumping action caused by the intrinsic elasticity of the eyepiece cups.

Details of the invention will become apparent from the ensuing description of a preferred embodiment, taken in conjunction with the drawing.

DESCRIPTION OF THE PREFERRED EMBODIMENT

Figure 1:
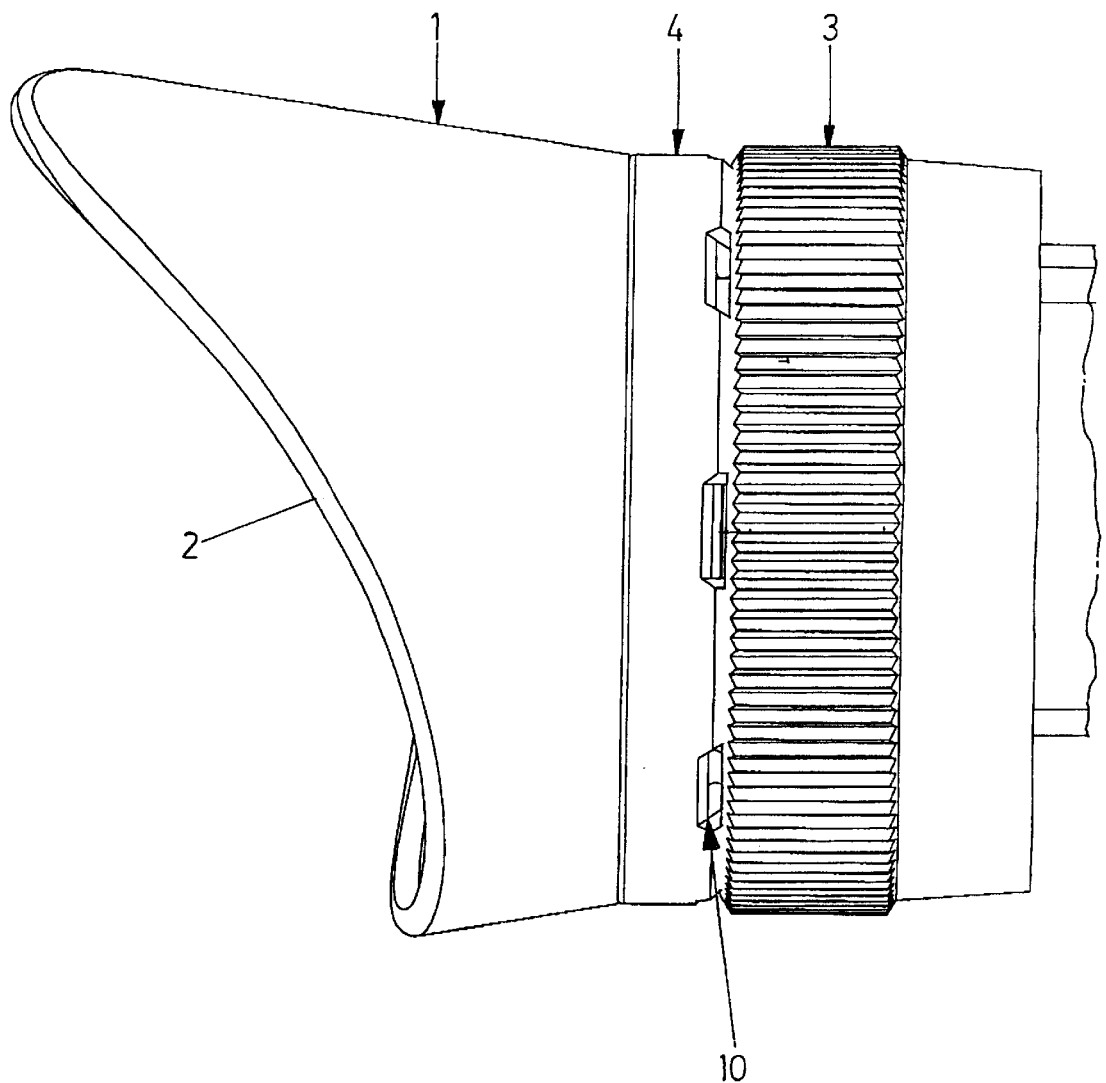
FIG. 1 is a side view of eyepiece cup according to the invention.

An eyepiece cup 1 seen in the drawing consists of a comparatively soft rubber material, the contact area 2 having a configuration which matches with the shape around the human eye. Eyepiece cups 1 of this type are conventionally provided on each of the two eyepieces 3 of binoculars.

Figure 2:
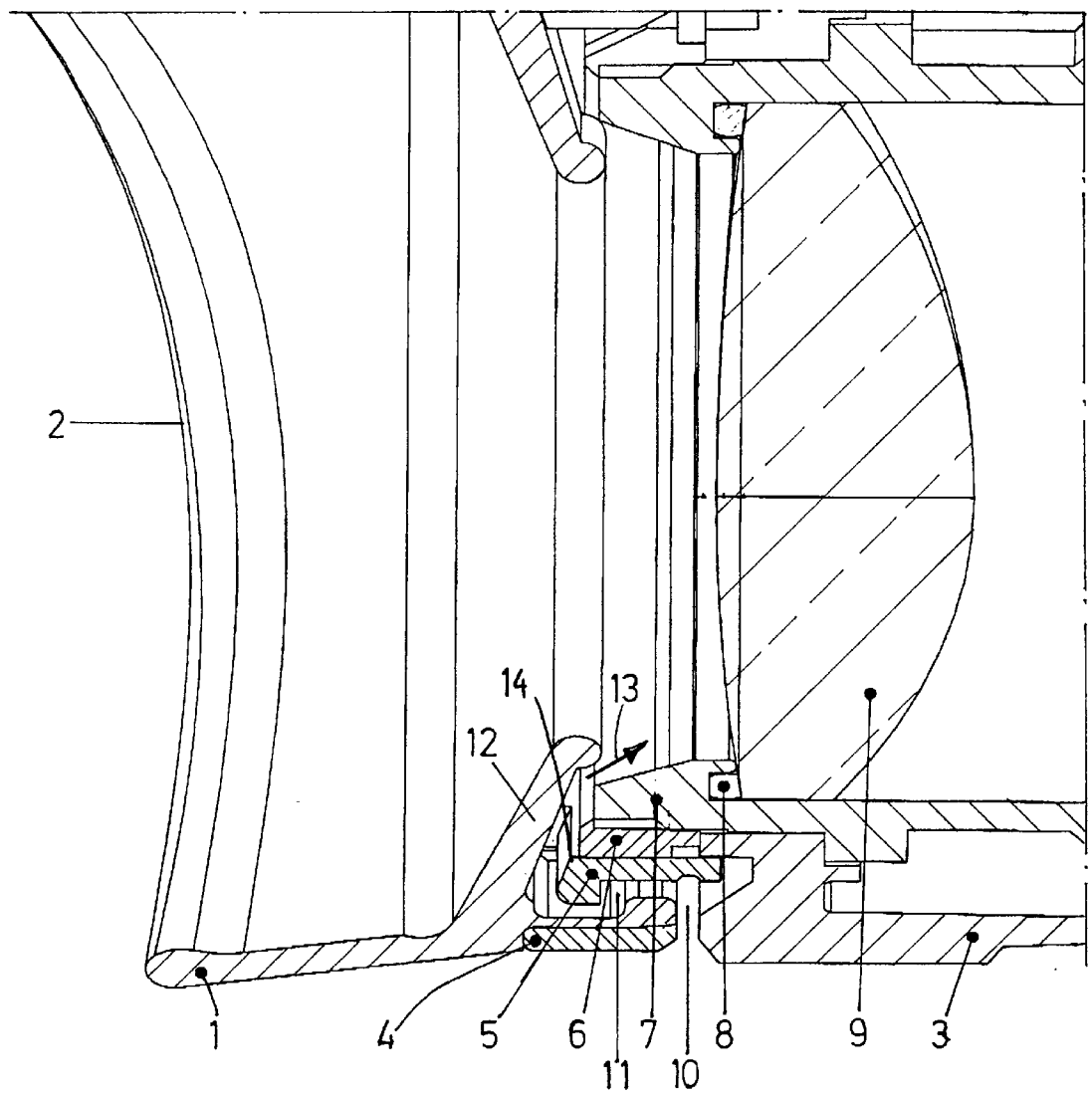
FIG. 2 is a sectional view, broken open, of the eyepiece cup of FIG. 1.

The way in which the eyepiece cup 1 is mounted on the eyepiece 3 can be seen in particular in FIG. 2. A clamping ring 4 is fixed to the eyepiece cup 1, a catch ring 5 and a threaded ring 6 being fixed together are engaged by catch ring 5 within this clamping ring 4 and then threadedly engaged to eyepiece 3. An eyepiece lens 9 is disposed on an eyepiece mounting 7 by way of an O-ring 8.

A plurality of air admission holes 10 are disposed at a distance from each other at the foot of the clamping ring 4 above the eyepiece 3.

Air is admitted from outside through the air admission holes 10 in clamping ring 4, then deviated via a channel 11 between clamping ring 4 and catch ring 5 into a channel 14 below an inward annular collar 12 of the eyepiece cup 1 and from there in a direction of the arrow 13 directly onto the eyepiece lens 9 so that the lens is kept non-fogging. This is possible since channels 10, 11, and 14 all communicate with each other and channel 14 opens opposite and facing the lens. This deviation prevents the air current from directly hitting the eye, there being no draught that might negatively affect the eye.

In order for the contact area 2 of the eyepiece cup 1 always to fit correctly on the user's face regardless of the adjustment of the eyepiece 3, the eyepiece cup 1 is pivotal relative to the eyepiece 3.

What is claimed is:

1. An eyepiece cup for binoculars which fits substantially tightly around a user's eye, the eyepiece cup (1) being fixed to a clamping ring (4) which is engaged to a catch ring (5) adapted to be fixed to an eyepiece (3);

wherein a first air admission channel (10) having a longitudinal length substantially perpendicular to an axis of the eyepiece (3) is provided through the clamping ring (4);

wherein the first air admission channel (10) communicates with a second air admission channel (11) located between the clamping ring (4) and the catch ring (5), the second air admission channel (11) having a longitudinal length which runs in most part parallel to the axis of the eyepiece (3);

wherein the second air admission channel (11) joins and communicates with a third air admission channel (14) having a longitudinal length extending between the eyepiece cup (1) and the catch ring (5) and the longitudinal length of which is positioned at angle to the longitudinal length of the second air admission channel (11);

wherein the third air admission channel opens facing towards and opposite a lens of the eyepiece (3);

wherein the lens is kept fog free by air traveling through the first, second and third air admission channels.

2. The eyepiece cup according to claim 1, wherein openings to the first air admission channel (10) are distributed around eyepiece cup (1) at a distance from each other in an area above the eyepiece (3).

3. The eyepiece cup according to claim 1, wherein the eyepiece cup (1) is rotatable relative to the eyepiece (3).

4. The eyepiece cup according to claim 1, wherein the eyepiece cup (1) consists of a flexible material so that a pumping effect is implemented by pressing on an outside of the eyepiece cup (1).

* * * * *